United States Patent [19]

Logan et al.

[11] Patent Number: 5,746,155
[45] Date of Patent: May 5, 1998

[54] WATER TREATMENT WITH LARGE NUMBERS OF NON-PATHOGENIC BACTERIA TO IMPROVE YIELD OF AQUATIC ANIMALS

[76] Inventors: Walter T. Logan, Postal Rte. 1, Box. 160, Buena Vista, Va. 24416; Stephen L. Bartlett, 5310 Cendronella Rd., Chapel Hill, N.C. 27514

[21] Appl. No.: 877,753

[22] Filed: Jun. 17, 1997

[51] Int. Cl.$^6$ .................................................. A01K 61/02
[52] U.S. Cl. ............................................................ 119/230
[58] Field of Search .................................... 119/200, 212, 119/215, 230, 242

[56] References Cited

U.S. PATENT DOCUMENTS

| Re. 34,837 | 1/1995 | Iwanami et al. |
|---|---|---|
| 3,880,827 | 4/1975 | Eble et al. |
| 4,640,227 | 2/1987 | Blancheton et al. |
| 4,992,179 | 2/1991 | Brierley et al. |
| 5,040,486 | 8/1991 | Pack ........................ 119/230 X |
| 5,081,954 | 1/1992 | Monus. |
| 5,423,988 | 6/1995 | Yamaseaki. |

FOREIGN PATENT DOCUMENTS 2809493  9/1979  Germany .................................. 119/230

OTHER PUBLICATIONS

Johnney Foster Bacterial Culture renovates useless pond, Practical Aquaculture & Lake Management 1991, pp. 12–13.

Boyd et al, Effect of Treatment with a Commercial Bacterial Suspension on Water Quality in Catfish Ponds, Dept. of Fisheries and Allied Aquacultures Alabama Agricultural Experiment Station, Auburn University, Alabama.

Impact–W, Biological Water Quality Enhancer, May 1993, USA Environment Dynamics Inc, Rockbridge County VA.

*Primary Examiner*—Thomas Price
*Attorney, Agent, or Firm*—Donavan Lee Favre

[57] ABSTRACT

The addition of a sufficient quantity of organisms of bacteria selected from the group comprising *Bacillus lentimorbus*, *Bacillus stearothermophilus* and *Bacillus cereus* and mixtures thereof to a fish pond increases the production of fish in the pond by over 25%.

14 Claims, No Drawings

WATER TREATMENT WITH LARGE NUMBERS OF NON-PATHOGENIC BACTERIA TO IMPROVE YIELD OF AQUATIC ANIMALS

CROSS REFERENCE TO RELATED APPLICATION

Applicants hereby claim the benefit of Provisional Application 60/020,031 filed Jun. 17, 1996 entitled WATER TREATMENT WITH *BACILLUS SUBTILIS* TO IMPROVE YIELD OF AQUATIC ANIMALS, naming the same inventors as the present application.

BACKGROUND OF THE INVENTION

1. Field of the Invention

This invention is directed to improving the production of aquatic non air breathing animals in an enclosed body of water by the addition large numbers of or one or more selected strains of non pathogenic bacteria to the body of water.

2. Description of the Background Art

Bacterial Culture Renovates Useless Pond, RECREATIONAL POND MANAGEMENT NEWS, Practical Aquaculture & Lake Management, Pages 12 and 13, Vol. No. 19,#2, March–April 1991, an article by Johnny Foster discloses converting a hog waste lagoon into an attractive fishing lake. This was accomplished by adding a biologically active bacteria seed cultures to help digest the sludge accumulated at the bottom of the waste lagoon. The seed cultures contained *Bacillus subtilis* were grown using standard fermentation technology. When ready, the entire culture, microorganisms, enzymes, and fermentation factors were harvested. They were dried and ground to a free flowing powder. Purity and potency were analyzed and maintained. Prior to application the powder was mixed into a slurry in two to three gallons of warm water. After waiting two to three hours, the mixture was stirred well and poured in several places around the pond. Slurry containing one pound of dry culture was applied each day for one week. Then the culture was applied twice per week for the next three weeks. BioAc(Ag-B) was invented by the present inventors Walter T. Logan and Stephen L. Bartlett and private labeled by K-Zyme Laboratories at that time.

Effect of Treatment with a Commercial Bacterial Suspension on Water Quality in Channel Catfish Ponds, Boyd et al, Department of Fisheries and Allied Aquacultures, Alabama Agricultural Experiment Station, Auburn University, Alabama 36849 believed to be published more than a year ago, discloses the results of a test of a bacteria suspension designed to improve fish production. The following claims were made for the suspension: prevents off-flavor; competes with blue green algae; reduces nitrate, nitrite, and ammonia concentrations; lowers phosphorus concentrations; increases concentrations of dissolved oxygen; increases rate of organic matter decomposition. The bacterial suspension has the trade name Aqua•Bacta•Aid® The bacterial suspension consists of *Bacillus subtilis*, Nitrobacter, Pseudomonas (two strains), Aerobacter, Cellumonas, and Rhodopseudomonas. The difference in fish production between the treated and untreated ponds was insignificant.

IMPACT-W™, BIOLOGICAL WATER QUALITY ENCHANCER, ENVIRONMENTAL DYNAMICS, INC. P.O. BOX 99, Natural Bridge Station, Va. 24579 discloses improving water quality by the addition of a proprietary formulation. The formulation contains Bacillus subtilis and was added to the water to enhance the aquatic environment for fish and other wildlife. The booklet discloses that the IMPACT-W™ water quality enhancer formula is used to enhance production in commercial fish, alligator and shrimp farms in Japan, Thailand, France, Canada and the United States. What was initially meant by that statement was that fewer fish and other species were lost due to poor water quality. Later it was discovered that *Bacillus subtilis* might be causing weight gain in fish and experimentation was begun to confirm the discovery. The publication date was May, 1993.

U.S. Pat. No. 3,880,827 Eble 1975 relates to a new compound bluensin and to its use as an antibacterial compound to prevent odor hi fish caused by *B. subtilis*. See column 5 lines 23 and 24.

U.S. Pat. No. 4,640,227 Blancheton et al. 1987 relates to processes for intensive shrimp breeding in tanks where a small proportion of the water is renewed, with a view to obtaining the growth of post-larvae more than 12 days old. Before placing the post-larve in the tank, the water is prepared by filling up the tank progressively and adding daily to that water an artificial food containing nitrobenous organic products until flocs, formed of heterotroph and nitrifying bacteria and phytoplanktons are obtained, serving as a complement of food to the shrimps which are fed with artificial food.

U.S. Pat. No. 4,992,179 Brierley 1991 is directed to the treatment of aqueous solutions containing cations of heavy metals with a biomass reaction product derived from a microorganism such as *Bacillus subtilis*, selective to the removal of heavy metals from solutions. The patent also discloses that living microbes have been used for metal recovery and that the cell walls of *B. subtilis* will take up metals from solution.

U.S. Pat. No. 5,081,954 Monus et al. 1992 discloses that water from a fish growth tank is pumped through multiple filter tanks and injected with ammonia fixing bacteria. Metabolic wastes from the fish growth tank are absorbed by hydroponic or sand growth beds. Oxygen content and temperature of the water is constantly monitored by sensors and air blowers and heater are activated when oxygen level or temperature respectively falls below the prescribed conditions for growth of the fish. All backwash water from a sludge digestion area is recirculated to the fish growth tank to conserve water in the system.

U.S. Pat. No. Re. 34,837 Kawasaki (1995) discloses that by giving mammals, fowls, fish, etc. feeds containing *Bacillus subtilis* C-3102 (FERM BP-1096), an excellent body weight gain and feed efficiency can be obtained.

U.S. Pat. No. 5,423,988 Yamasaki (1995) discloses subjecting tetra methyl ammonium hydroxide to a multi stage biological treatment. Sludge separated from the waste water is returned from the first and second settling tanks to first and second mixing tanks , respectively, and mixed with *Bacillus subtilis* Kubota and excess household sludge. Other kinds of *Bacillus subtilis* can be used as far as they have the same stickiness quality and the ability to deodorize and decompose organic substances. See column 7 lines 27 to 30. In the third treatment tank ammonia nitrogen and nitrite nitrogen, which are toxic to fish, are oxidized into nitrate nitrogen my microorganisms which stick to and grow on the mesh tubes and calcium carbonate mineral (and activated carbon). See column 8 , lines 44 to 48.

BRIEF SUMMARY OF THE INVENTION

The present invention is directed to a method for improving the yield of aquatic non air breathing animals grown in an enclosed body of water. A sufficient amount of non pathogenic bacteria is added to the body of water to increase the weight gain of aquatic animals grown in the body of water above the weight gain of aquatic animals grown in a body of water to which large numbers of non pathogenic bacteria was not added. This addition of large numbers of non pathogenic bacteria is done optionally before and during the stocking of the body of water with a species of a non air breathing aquatic animal. The species is allowed to grow to harvesting size while still preferably adding large numbers of non pathogenic bacteria to the water. The grown non air breathing aquatic species is then harvested and the above steps are repeated.

The above average growth of the aquatic non air breathing animals is believed to be due in part to the presence of the large numbers of non pathogenic bacteria creating a healthier environment for the non air breathing aquatic animals.

Preferably the non pathogenic bacteria culture which is added to the water is initially in the form of a dry powder mixed with micronutrients and macronutrients. Prior to use, warm water is added to the mixture and the culture allowed to multiply for a period of one half to two hours. At or near the peak bacterial count the large numbers of non pathogenic bacteria are added to the enclosed body of water.

The present invention significantly improves the yield of catfish from a catfish farm wherein the fish have a density at peak of from 4,000 to 18,000 fish per surface acre. Fish ponds are usually four feet deep. Fish are normally fed until the fish stop consuming feed. Normal feeding intervals are employed.

The method of the present invention for improving the yield of aquatic non air breathing animals grown in an enclosed body of water comprising the following steps, not necessarily in the order recited. Sufficient non pathogenic bacteria are added to the body of water to increase the weight gain of aquatic animals grown in the body of water more than 10% compared to the weight gain of aquatic animals grown in a body of water to which non pathogenic bacteria were not added. The body of water containing the large number of non pathogenic bacteria is stocked with a species of non air breathing aquatic animals and the species is allowed to grow to harvesting size. The grown non air breathing aquatic species is then harvested. The above steps are then repeated.

Sufficient non pathogenic bacteria can be added to the body of water to increase the weight gain of aquatic animals grown in the body of water more than 25% compared to the weight gain of aquatic animals grown in a body of water to which non pathogenic bacteria was not added.

Preferably the non pathogenic bacteria is selected from the group comprising *Bacillus lentimorbus, Bacillus stearothermophilus, Bacillus cereus* and mixtures of any two or more of the above species. Preferably a minimum of $2.5 \times 10^{12}$ organisms of the recited species are added per surface acre of the body of water. Preferably the level of recited subspecies in the body of water is initially at a level of from $2.5 \times 10^{12}$ to $2.5 \times 10^{13}$ organisms per surface acre of the body of water.

The method of the present invention is particularly applicable wherein a high density of from 1,000 to 20,000 of selected aquatic animals to be harvested are present per surface acre. For catfish a preferred range is from 4,000 to 18,000 catfish present per surface acre.

Preferably sufficient non pathogenic organisms selected from the group consisting of *Bacillus lentimorbus*, *Bacillus stearothermophilus*, *Bacillus cereus* and mixtures of any two or more of the above species is added to maintain a minimum of $2.5\times10^{12}$ organisms per surface acre during the period the aquatic animal grow to harvesting size.

The selected non pathogenic organisms can be *Bacillus lentimorbus*, *Bacillus stearothermophilus*, *Bacillus cereus*. Preferably a mixture of bacteria is employed.

Examples of other bacteria that can be employed in the practice of the present invention include any non pathogenic Bacillus including *Bacillus subtilis* and other non pathogenic rod-shaped bacterium used to improve water quality.

Preferably a sufficient amount of the non pathogenic species or mixture of species is added to increase the weight gain of the aquatic animals by 25% or more compared to the weight gain of aquatic animals grown in a body of water to which non pathogenic bacteria was not added.

DETAILED DESCRIPTION

IMPACT™ Trials on Koi in Closed Systems

A study was undertaken to determine the exact benefits and potential detriments conferred through the use of IMPACT™, a natural bacterial product containing non pathogenic bacteria. Other ingredients packaged with the non pathogenic bacteria include materials usually packaged with bacterial cultures such as buffers, nutrients, and hydroscopic agents to keep the product dry until use. Ingredients include bicarbonate of soda, sugar such as sucrose, and HUBERSORB hydroscopic agent.

Two test systems were set up containing 150 gallons each. The subject tanks were set indoors, in a temperature controlled environment, and shared identical day lengths. Both systems were run with 300 watt submersible electric heaters at 80° F. Each system had identical wet/dry filtration systems charged with virgin media, to include an identical mixture totaling 17 liters each of lava rock and synthetic BIO-BALLS. The flow rate in each system was 378 gallons per hour.

Both systems were fed the identical food, in identical amounts, at identical times. For this study Tetra's POND STICKS (color enhancing type) were selected. Each day at 1:00 PM EST, the water was checked for a variety of parameters including:

Dissolved Oxygen
Ammonia
Alkalinity
Hardness
Nitrites
pH
Temperature

Later in the study, Secchi discs were replaced by Imhoff Cones in order to monitor the actual suspended solids in both systems. It is believed that the product has an additional benefit in the degradation of these solid wastes, resulting in less sludge accumulation in the static water systems.

Additional emphasis was placed on whether the treated system experienced any deterioration in dissolved oxygen concentrations after addition of the product.

Seven days before the system startup, the parallel tanks were filled and allowed to de-gas for one week without circulation. To preclude the potential for pathogens upsetting the study and results, a group of fish used in the study, plus one, were quarantined and treated with salt at 0.3% for one week prior to installation in the parallel systems. They were closely observed in the quarantine for macroscopic parasites such as Lernea Elegans and Argulus. These two pathogens, in particular, predispose fish to ulcer disease (Aeromonas Bacterial infection) which could affect the possible conclusions regarding safety of the product. The "plus one" fish was sacrificed and found to be pathogen free.

The day before startup, the systems were plumbed and filters were installed, using virgin media, and circulation was started. Water parameters were checked and recorded. All values for ammonia and nitrite were zero. On the first day of startup, the first six fish were added to the system, three to each tank. Ammonia had already begun to climb in the system. The second day, the second six fish were added to the system, three to each tank, making a total of 12 fish per system. Two fish jumped from one of the tanks and were lost. One fish from the other tank was resettled in the tank that lost two fish to even the population at eleven fish in each tank.

On the fourth day 4.5 tablespoons of IMPACT™ water quality enhancer was added to the test tank, the other tank in the test was a control tank. The composition of IMPACT™ consists of bacterial cultures on bran, nutrients, buffers and a hydroscopic agents. Twenty five pounds of IMPACT™ contain 6 pounds of NAS 1 and two pounds of DYNABAC 1000, 11 pounds of bicarbonate of soda, 5.8 pounds of sugar, and 0.8 pounds of HUBERSORB desiccant. NAS 1 and DB 1000 are available from Environmental Dynamics Inc., PO Box 99, Natural Bridge Station, Va. 24579. NAS 1 is a mixture of *Bacillus lentimorbus* strains and *Bacillus stearothermophilus* strains and is also available from Ryter Labs. Dynaback 1000 is *Bacillus cereus* and is also available from Nugen, Inc.

On the sixth day, one cup of pelletized domestic limestone was added to each system to preserve the pH. On the tenth day an additional 4.5 tablespoons of IMPACT-A™ water quality enhancer was added. On the eleventh day a 60% water change was required to salvage the subject fish from ammonia rise. On the eighteenth day an additional 4.5 tablespoons of IMPACT-A™ water quality enhancer was added to each system.

At the conclusion of the test, the fish in the treated group were fully twice as developed as those in the control group. The addition of the loading dose of the IMPACT™ water quality enhancer consumed a mere 1 ppm of dissolved oxygen for the first 48 to 72 hours following application. IMPACT™ water quality enhancer only briefly decreased ammonia concentration by less than 1 ppm and that benefit was only noted for 24 hours. IMPACT™ water quality enhancer did not cause or exacerbate bacterial ulcers in treated Koi. The addition of IMPACT™, by action of the bacterial cultures therein or the buffers that stabilize it, coffered superior clarity to the water. IMPACT™ contains an excellent buffer that stabilizes the pH near neutral and confers protection of the pH by adding to total alkalinity.

The average starting weight for the control group was 14.27 grams. The average starting weight for the treated group was 14.82 grams. The average finish weight for the control group was 18.82 grams. The average finish weight for the treated group was 26 grams. The average ammonia concentration was 1.11 ppm in the control tank and 1.3 ppm in the treated tank. The ammonia concentration reached 3 ppm in the treated tank on days 15 and 16 as compared with 2.5 ppm in the control tank on the same days. The average nitrite concentration in the control tank was 0.13 ppm as compared with 0.15 in the treated tank. The averages ran fairly parallel from study day 1 to study day 32 reaching a maximum of 0.50 on days 20 through 24 for both systems. The average pH for the control group was 7.28 as compared with an average of 7.47 for the treated group with the pH of the treated group being far more consistent through a 19 day period.

The following, except for the description of the contents of IMPACT-A™ fish weight enhancer, is a report from the Mississippi State University Department of Agricultural Economics. Preliminary Report on the Results of Applying IMPACT-A™ fish weight enhancer, a Biological Product on Feed Consumption and Catfish Production in Open Ponds in the Delta Area of Mississippi, 1995.

INTRODUCTION

IMPACT-A™ fish weight enhancer is a biological product developed by Environmental Dynamics, Inc. It consists of a mixture of 23.5 pounds of sodium bicarbonate, 18.5 pounds of sugar, 1.5 pounds of HUBERSORB desiccant, 11.75 pounds of a NAS-1, a mixture of *Bacillus lentimobus* strains and *Bacillus stearothermophillus* strains, 18.5 pounds of NAS-5 which has the same mixture of bacteria strains as NAS-1 and in addition contains amylase and lipase enzyme, and 2.0 pounds of Dynaback 1000 which consists of *Bacillus cereus*.

Conventional micronutrients and macronutrients are also present. Dewatered humus containing humic acid and ulmic acid is also present.

The IMPACT-A™ fish weight enhancer organisms improve water quality in aquaculture ponds. The IMPACT-A™ fish weight enhancer organisms are the same as those that occur in nature. The IMPACT-A™ fish weight enhancer product concentrates these organisms to a concentration of $4.5 \times 10^8$. The treatment technique of adding the microorganisms and micro nutrients to warm water causes the organism to multiply to even larger numbers for an hour just prior to adding the IMPACT-A™ fish weight enhancer to a pond.

WATER QUALITY EFFECTS

At the current stages of development, all of the impacts on water quality are not known. However, the product is designed to reduce the amount of ammonia in the ponds compared to the level expected if the same conditions exist in the pond without the treatment. Further research will more thoroughly identify water quality impacts.

PRODUCT FORM AND METHOD OF TREATMENT

IMPACT-A™ fish weight enhancer is in a dry powder form in sealed containers to prevent moisture absorption prior to use. The bacteria are dormant and are packaged with micro nutrients that will promote rapid multiplication during the treatment process.

The optimum treatment for ponds is not known and will be a major objective of future research. The rate used in the tests was 12 pounds of IMPACT-A™ fish weight enhancer per water surface acre for the initial treatment and approximately 4 pounds per water surface acre were used per weekly treatment beginning on Apr. 26, 1995 and ending oil Oct. 19, 1995. Due to shipping problems, two treatments were missed during the period. Also, the last few weeks of the treatment used double strength product.

Applying the IMPACT-A™ fish weight enhancer to the ponds involved weighing the appropriate amount of IMPACT-A™ fish weight enhancer into a large container and adding 1.5 gallons of water per pound of product at a temperature of from 80° to 100° F. The slurry formed was allowed to stand for one hour minimum before being added to the pond. The pond water was mixed with aeration devices normally used to aerate the ponds. This procedure mixed the IMPACT-A™ fish weight enhancer throughout the pond.

DESIGN OF THE IMPACT-A™ FISH WEIGHT ENHANCER TEST

Six ponds were involved in the test. Acreage per pond ranged from 3.7 to 9.8 water acres. Three ponds were designated as control ponds and three were designated as treatment ponds. Ponds were assigned to each group on a random basis. The treatment ponds consisted of 15.9 water surface acres. All ponds contained fish overwintered from 1994 and fish stocked in early 1995. The records of the farm owner were the basis for fish numbers and fish weight.

Fish numbers and pounds in the control ponds averaged 19,372 and 4,788 per water surface acre, respectively. Fish numbers and pounds in the treatment ponds averaged 17,363 and 3,492 per water surface acre, respectively.

One control pond had greater numbers and more pounds that the other five ponds. This is the reason for the differences observed in the initial status of the control versus the treatment ponds.

RESULTS

Fish in the ponds that were treated with IMPACT-A™ fish weight enhancer consumed more feed and therefore produced more fish. All results reported are the best estimates available. Accuracy would be increased if each and every fish were counted and weighed both before the test began and at the conclusion. Counting and weighing all fish in a test of this nature is impractical. The data collected from this test is than same as data that the farmer uses to make his management decisions. Precise data requires that the product be tested in a small-scale scientific experiments where counting and weighing are practical.

Fish production in control ponds averaged 4,990 pound per water surface acre compared to 9,099 in treated ponds. The net increase in fish production per water surface acre is estimated at 4,109 pounds, or an increase of 82% over the control ponds.

Feed conversion for the control and treatment ponds was essentially the same. Fish in the treated ponds consumed 7,091 ponds more, on an average, than control ponds.

ECONOMIC VALUE OF IMPACT-A™ FISH WEIGHT ENHANCER

The economic value of IMPACT-A™ fish weight enhancer based on results of this test is indicated by the difference in additional revenue less the associated costs. Revenue from 4,109 pound of additional production valued at $0.79 per pound is $3,246 per water surface acre. Additional costs were $1,377 resulting in a net revenue of $1,869.

These results from a field test are sufficient to warrant additional research and development efforts. Should further scientific research confirm results within 20% of this test result, the product could have a significant impact on the farm-raised catfish industry.

One problem not reported in the above test results is the problem of a massive fish kill in a pond not reported in the above test. The above tests and further testing will establish that the massive fish kill was not the fault of the IMPACT-A™ fish weight enhancer.

We claim:

1. A method for improving the yield of aquatic non air breathing animals grown in an enclosed body of water comprising,
    a) adding sufficient numbers of non pathogenic bacteria to the body of water to increase the weight gain of aquatic animals grown in the body of water more than 10% compared to the weight gain of aquatic animals grown in a body of water to which non pathogenic bacteria were not added,
    b) stocking the body of water with a species of non air breathing aquatic animals and allowing the species to grow to harvesting size,
    c) harvesting the grown non air breathing aquatic species,
    d) repeating the steps a), b), and c).

2. The method of claim 1 wherein sufficient numbers of non pathogenic bacteria are added to the body of water to increase the weight gain of aquatic animals grown in the body of water more than 25% compared to the weight gain of aquatic animals grown in a body of water to which non pathogenic bacteria were not added.

3. The method of claim 1 wherein a minimum of $2.5 \times 10^{12}$ organisms of non pathogenic rod shaped bacteria including Bacillus subtilis are added per surface acre of the body of water.

4. The method of claim 1 wherein the bacteria is one or more strains selected from the group comprising Bacillus lentimorbus, Bacillus stearothermophilus and Bacillus cereus strains.

5. The method of claim 4 wherein from $2.5 \times 10^{12}$ to $2.5 \times 10^{13}$ organisms of bacteria are added per surface acre of the body of water.

6. The method of claim 1 wherein from 1,000 to 20,000 of selected aquatic animals to be harvested are present per surface acre.

7. The method of claim 6 wherein from 4,000 to 18,000 of the aquatic animals are present per surface acre.

8. The method of claim 7 wherein sufficient organisms selected from the group consisting of Bacillus lentimorbus, Bacillus stearothermophilus and Bacillus cereus strains and mixture any two or more of the above strains are added to maintain a minimum of $2.5 \times 10^{12}$ organisms per surface acre during the period the aquatic animal grow to harvesting size.

9. The method of claim 8 wherein one of the organisms is Bacillus lentimorbus.

10. The method of claim 8 wherein one of the organisms is Bacillus stearothermophilus.

11. The method of claim 8 wherein one of the organisms is Bacillus cereus.

12. The method of claim 8 wherein a sufficient number of Bacillus lentimorbus, Bacillus stearothermophilus and Bacillus cereus organisms are added to increase the weight gain of the aquatic animals by 25% or more compared to the weight gain of aquatic animals grown in a body of water to which Bacillus lentimorbus, Bacillus stearothermophilus and Bacillus cereus organisms were not added.

13. A method for improving the yield of aquatic non air breathing animals grown in an enclosed body of water comprising,
    a) adding sufficient numbers of Bacillus lentimorbus, Bacillus stearothermophilus and Bacillus cereus organisms and mixtures of any two or more of the above organisms to the body of water to increase the weight gain of aquatic animals grown in the body of water,
    b) stocking the body of water with a species of non air breathing aquatic animals and allowing the species to grow to harvesting size,
    c) harvesting the grown non air breathing aquatic species,
    d) repeating the steps a), b), and c).

14. The method of claim 13 wherein the organisms consists essentially of Bacillus lentimorbus, Bacillus stearothermophilus and Bacillus cereus.

* * * * *